US011723385B2

United States Patent
Gombos et al.

(10) Patent No.: US 11,723,385 B2
(45) Date of Patent: Aug. 15, 2023

(54) COMPOSITION OF LIVESTOCK FEED AND METHOD OF MANUFACTURING THE SAME

(71) Applicant: The Gombos Company, LLC, Bakersfield, CA (US)

(72) Inventors: John M. Gombos, Bakersfield, CA (US); John E. Gombos, Bakersfield, CA (US)

(*) Notice: Subject to any disclaimer, the term of this patent is extended or adjusted under 35 U.S.C. 154(b) by 787 days.

(21) Appl. No.: 16/567,240

(22) Filed: Sep. 11, 2019

(65) Prior Publication Data

US 2020/0138059 A1 May 7, 2020

Related U.S. Application Data

(60) Provisional application No. 62/754,515, filed on Nov. 1, 2018.

(51) Int. Cl.

| | | |
|---|---|---|
| *A23K 30/15* | (2016.01) | |
| *B65B 27/12* | (2006.01) | |
| *A23K 10/30* | (2016.01) | |
| *A23K 40/25* | (2016.01) | |

(52) U.S. Cl.
CPC .............. *A23K 30/15* (2016.05); *A23K 10/30* (2016.05); *A23K 40/25* (2016.05); *B65B 27/125* (2013.01)

(58) Field of Classification Search
CPC ........ A23K 30/15; A23K 40/25; A23K 10/30; B65B 27/125
USPC ........................... 426/54, 615, 623, 807, 519
See application file for complete search history.

(56) References Cited

U.S. PATENT DOCUMENTS

| | | |
|---|---|---|
| 5,001,974 A | 3/1991 | Gombos |
| 5,090,177 A | 2/1992 | Gombos et al. |
| 5,111,931 A | 5/1992 | Gombos et al. |
| 5,175,981 A | 1/1993 | Gombos et al. |
| 5,236,297 A | 8/1993 | Gombos et al. |
| 5,238,104 A | 8/1993 | Gombos et al. |
| 5,343,670 A | 9/1994 | Gombos et al. |
| 5,364,226 A | 11/1994 | Gombos et al. |
| 5,390,783 A | 2/1995 | Gombos et al. |
| 5,689,941 A | 11/1997 | Gombos et al. |
| 5,736,176 A | 4/1998 | Gombos et al. |
| 5,887,504 A | 3/1999 | Gombos et al. |
| 5,927,188 A | 7/1999 | Gombos et al. |
| 6,016,731 A | 1/2000 | Gombos et al. |
| 6,202,548 B1 | 3/2001 | Gombos et al. |
| 2002/0068118 A1 | 6/2002 | Gombos et al. |
| 2013/0156932 A1 | 6/2013 | Freund et al. |
| 2014/0342038 A1 | 11/2014 | Lewis et al. |

FOREIGN PATENT DOCUMENTS

| | | |
|---|---|---|
| CN | 101744146 A | 6/2010 |
| WO | WO0013525 A1 | 3/2000 |
| WO | WO2000013525 A1 | 3/2000 |
| WO | WO2015041556 A1 | 3/2015 |

OTHER PUBLICATIONS

Hayforks.com How Much Does a Bale of Hay Weight? pp. 1-4, https://hayforks.com/blog/how-much-does-a-bale-of-hay-weigh, 2022 (Year: 2022).*
Bale Press, Steffen Systems, "High Density Bale Compression Systems", https://steffensystems.com/oldsite/Products/Bale_Press/index.htm, 2022, p. 1. (Year: 2022).*
Big Bale to Small Bale, Steffen Systems, "Big Bale to Small Bale Conversion Systems", https://steffensystems.com/oldsite/Products/Conversion_Systems/index.htm, 2022, p. 1. (Year: 2022).*
Ohio BEEF Cattle Letter, Baleage Mistakes Can Lead to Major Health Consequences, pp. 1-7, https://u.osu.edu/beef/2017/04/26/baleage-mistakes-can-lead-to-major-health-consequences, 2017. (Year: 2017).*
U. S. Dairy Forage Research Center, USDA, Future of Forage Crops: Alfalfa and Corn Silage, pp. 1-3. (Year: 2005).*
"Moisture content important when baling alfalfa", 2007, https://www.joplingglobe.com/archives/moisture-content-important-when-baling-alfalfa/article, pp. 1-4 (Year: 2007).*
Vermeer Corporation, 2015 , "Why baleage has an advantage over dry hay", https://www.beefmagazine.com/vermeer-corporation/why-baleage-has-advantage-over-dry-hay (Year: 2015).*

\* cited by examiner

*Primary Examiner* — Helen F Heggestad
(74) *Attorney, Agent, or Firm* — James M. Duncan; Scanlon Duncan LLP

(57) ABSTRACT

A feed product for livestock is made up of alfalfa and corn silage, each having a specified moisture content. The alfalfa and corn silage are blended and baled to achieve a moisture content of approximately 30 percent and a dry matter intake of approximately 70 percent without requiring any rehydration.

20 Claims, No Drawings

COMPOSITION OF LIVESTOCK FEED AND METHOD OF MANUFACTURING THE SAME

BACKGROUND OF THE INVENTION

The present invention pertains to the compositions and methods of manufacture of livestock feeds. More particularly, the present invention discloses a method for optimizing dry matter intake in a feed composition for livestock, and a compressed and baled feed composition produced through the disclosed method.

One of the inventors herein is a named inventor in U.S. Pat. No. 5,736,176 entitled "High Density Combination Dry Hay and Haylage/Silage Livestock Feed-Making Method". The '176 patent discloses a method of making a mixed feed livestock cargo unit suitable for long distance shipping. The '176 patent discloses various pieces of machinery utilized for blending and compressing of livestock feed. The '176 patent is incorporated herein by this reference with respect to those pieces of machinery. However, while similar machinery may be utilized in the invention of the '176 patent and the intention herein, the '176 patent does not teach a composition of animal feed having the same characteristics as disclosed herein or a method of manufacture which produces such a composition.

Livestock feeds are often exported outside of the United States and particular consideration must be given to the packaging of the feeds. Conventionally, livestock fodders have been packaged and stored in a number of different ways. One of the most common is in the form of hay, in which the fodder is cut and sun dried, and then is typically baled. Another common form of livestock feed is silage or haylage, in which feeds such as corn or alfalfa are cut, chopped and ensiled in a high moisture condition so as to ferment. Another form of livestock feed is pellets or cubes of fodder that have been finely chopped and extruded—this form is preserved, stored and shipped in a dry state. Each form of feed has its own advantages and disadvantages.

For long distance shipping, especially overseas, preservability and economical shipability of livestock feed are critical issues. Historically, only dry feeds, such as hay and cubes or pellets, have met both criteria. Pellets and cubes have a relatively high density, and preserve adequately as long as they are kept dry, but are expensive to produce and not have the desirable long fiber characteristics of feeds for lactating animals. Baled hay is a somewhat less expensive form of feed, and stores and ships well as long as it is kept dry, but hay is also less dense and has a relative shipping cost higher than for pellets. In the last four decades, however, it has become common for hay bales to be double compressed to increase shipping efficiencies. In particular, it has become commonplace to ship double-compressed baled hay from the United States to foreign countries that lack adequate feed production capacity, such as Japan.

In order for hay to be stored, and even more importantly, for long distance shipping, the hay must be thoroughly dried. Otherwise, the hay can mold, mildew, oxidize and spoil, and can heat and possibly even ignite due to spontaneous combustion. For transoceanic shipping in enclosed cargo containers, the hay should have a moisture content of less than about 12%. Double-compressed baled hay typically weighs 20 to 30 pounds per cubic foot.

Dried hay has several drawbacks. One drawback is that the drying process reduces the feed value of the hay, and the feed value continues to deteriorate gradually over time. Another drawback is that dry hay is not as palatable, nor as digestible, as fresh hay. Pellets and cubes are not any better in this regard.

Livestock fodders have also commonly been stored in the form of silage, such as chopped corn or sorghum, or haylage, which is wet chopped hay. For convenience hereinafter, this type of feed will be referred to collectively as silage, except where haylage is specified. The storage mechanism for silage is entirely different from that of dried hay. The fodder is ensiled, that is, it is chopped and packed tightly into a silo or storage pit, plastic bag or other sealable container, and is preserved by fermentation. Silage-type feeds must be stored with a very high moisture content, over 40% and preferably around 60% water. Fermenting the chopped, wet fodder in an essentially air-free environment forms acids and alcohol which aid in preserving the silage.

Silage has several advantages over dry hay. The silage method of preserving the feed maintains a very high proportion of the initial nutrient value of the feed. The ensiled feed maintains a high nutrient content for a long period of time. The silage is very palatable and very digestible by livestock. Because it is moist and tender, The feed is very tasty and it can be digested easily by cattle. Therefore, silage-type fodders area very desirable livestock feed, particularly for dairy and feedlot herds.

Silage-type feeds suffer, however, from two main disadvantages. One disadvantage is that such feeds are very heavy as well as bulky because they contain a very high percentage of water. Therefore, it is uneconomical to transport silage-type feeds over any significant distance. The other main disadvantage is that silage-type feeds can spoil within a matter of hours when exposed to the air.

Some livestock owners have tried blending silage or haylage with dry hay to improve the quality of the feed. However, because the silage can quickly spoil, such blending is generally done where the blended feed product is to be consumed.

Dry Matter ("DM") means, with respect to hay, the remaining constituents after removal of water moisture. These constituents consist of protein, carbohydrates, various forms of fiber and other minerals/vitamins. DM factors into an animal's Dry Matter Intake ("DMI"), which is also impacted by weather, stress, lactation period, palatability, and others. Many experts now recognize the important relationship between DMI and the nutritional value of the feed. The reason DMI is so important is because it is directly related to digestibility of the feed. If a feed product is too dry, the animals have a difficult time swallowing and digesting it. Conversely, if a feed product has too high a moisture content, the feed will flow right through the animal before it can fully digest the product. It has been proposed that a dry matter composition of 65-70% results in the optimal DMI for ruminant animals However, none of the known livestock feeds provide the optimal DMI without blending or rehydration at the location where the feed is consumed.

SUMMARY OF THE INVENTION

Embodiments of the present invention provide a feed product for livestock comprised of alfalfa and corn silage which are blended and baled to achieve a moisture content ranging from 28 to 40 percent and a DM ranging from 60 percent to 72 percent without requiring any rehydration. The process calls for the two ingredients to be blended to a specific ratio, with each ingredient having a narrow range of moisture content. The blended ingredients are metered through any high-density hay press (fixed or mobile), baled and discharged from the press, sleeved and/or sealed tightly to exclude air. The inventors herein have determined that an extrusion press works particularly well in this process. The combination of the alfalfa and corn silage at the specified amounts and moisture contents, the compression, and the air tight packaging results in a reactivated fermentation which provides significant benefit to the product.

Once baled and sealed, the product may be loaded into sea containers and exported to overseas markets. The product may be baled into packages of approximately 500 kilograms having a density of approximately 30 lbs. per cubic foot. So long as the air tight wrapper is not penetrated or significantly disturbed, the product is expected to have a storage life of 2-3 years.

The process of high-density baling at certain ranges of pressure eliminates air, texturizes alfalfa leaves and stems, opens and softens corn grains, and disperses water particles evenly throughout each bale. The process of sleeving and/or sealing each bale prevents air and moisture intrusion or seepage and activates a fermentation process which completes in approximately 14 days. The Inventors herein have discovered that this "secondary fermentation" (following the initial fermentation of the silage) occurs with the specified blend of alfalfa and silage having the specified moisture contents with the product prepared according to the described process. The airtight sealing of the bales during this secondary fermentation provides a natural fumigation process because carbon dioxide generated during the fermentation is sealed within the bales by the air-tight wrapper. Carbon dioxide is an effective fumigant for certain pests, including insects and mold spores which otherwise damage stored organic products, such as animal feed.

Embodiments of the disclosed invention are therefore naturally stabilized from spoliation by the combination of the specific ratios of hay and silage, the specific moistures of the mixed products, the processing of the bales, and the airtight packaging. As discussed above, this combination results in a cattle feed which may be economically shipped and stored without spoilage, is nutritionally dense, and which is very appetizing to livestock.

The constituted product is ready to feed to livestock upon opening without requiring rehydration because the disclosed compositions already have a DM ranging from 60% to 72%. The bales may be stored for approximately the same amount of time as baled hay, i.e., 2-3 years, so long as the air tight packaging is not disturbed. Once a sealed bale is opened, it should be fed within a recommended 5-7 days.

An additional benefit of the compression process is the further conditioning and flattening of the grain in the corn silage. Grains are typically steamed and rolled when fed to cattle to provide higher nutrient consumption. When this operation is performed by a dedicated facility, it adds significantly to the expense of the feed. However, with embodiments of the present invention, additional conditioning andflattening of the grain is achieved through embodiments of the process and is an added benefit of the invention.

DETAILED DESCRIPTION OF THE INVENTION

The disclosed process for optimizing dry matter intake in a feed composition for livestock utilizes the following steps: (1) measuring out a first weight of dry alfalfa and a first weight of corn silage; (2) blending the first weight of dry alfalfa with the first weight of corn silage to result in a first blend having a weight percent of dry alfalfa ranging from fifty percent to seventy-two percent and a weight percent of corn silage ranging from twenty-eight percent to fifty percent; (3) metering the first blend to a high density hay press, such as an extrusion press; (4) pressing the first blend in the high hay press into a bale; (5) consolidating the bale to maintain its bale configuration; (6) discharging the bale and sealing it in a silage-grade plastic wrap resulting in a wrapped and airtight bale; and (7) storing the wrapped and sealed bale for a period ranging from 10 to 17 days resulting in a fermented haylage. Consolidation of the bale may be achieved by sleeving the bale, binding it with straps, twine, wire, etc., or by utilizing a vacuum consolidation process.

The above process produces a compressed and baled feed composition for livestock comprising: (1) fifty to seventy-two percent by weight dry alfalfa having an initial moisture content ranging from eight to twenty percent; (2) twenty-eight to fifty percent by weight corn silage having an initial moisture content ranging from fifty to seventy-five percent; (3) a density ranging from twenty-five to thirty-five pounds per cubic foot; (4) a finalized moisture content of less than thirty-five percent; and (5) a dry matter intake of approximately sixty-five percent.

The process for producing embodiments of a compressed and baled feed composition for livestock having a dry matter of approximately sixty-five percent may also be described as having the following steps: (1) providing a dry alfalfa having a moisture content ranging from eight to twenty percent; (2) providing a corn silage having an initial moisture content ranging from fifty to seventy-five percent; (3) blending the dry alfalfa with the corn silage to result in a first blend having a weight percent of dry alfalfa ranging from fifty percent to seventy percent and a weight percent of corn silage ranging from thirty percent to fifty percent; (4) metering the first blend to a high-density hay press; (5) pressing the first blend in the high density hay press into a bale having a density of approximately thirty pounds per square foot; (6) consolidating the bale; (7) sealing the bale in a silage-grade plastic wrap resulting in a wrapped bale; and (8) storing the wrapped bale for a period ranging from 10 to 17 days.

Having thus described the preferred embodiment of the invention, what is claimed as new and desired to be protected by Letters Patent includes the following:

1. A process for optimizing dry matter intake in a feed composition for livestock comprising the following steps:
    measuring out a first weight of dry alfalfa and a first weight of corn silage;
    blending the first weight of dry alfalfa with the first weight of corn silage to result in a first blend having a weight percent of dry alfalfa ranging from 50 percent to 72 percent and a weight percent of corn silage ranging from 28 percent to 50 percent;
    metering the first blend to a high-density hay press;
    pressing the first blend in the high-density hay press into a bale;
    consolidating the bale;
    sealing the consolidated bale in a silage-grade plastic wrap resulting in a wrapped and airtight sealed bale having a weight of approximately 500 kilograms, with carbon dioxide generated during the fermentation process captured within the wrapped and airtight sealed bale; and
    storing the wrapped sealed bale for a period ranging from 10 to 17 days resulting in a fermented feed composition.

2. The process of claim 1 wherein a sleeve is used to consolidate the bale.

3. The process of claim 1 wherein a strap is used to consolidate the bale.

4. The process of claim 1 wherein twine is used to consolidate the bale.

5. The process of claim 1 wherein a vacuum is applied to consolidate the bale.

6. The process of claim 1 wherein the bale has a density ranging from 25 to 35 lbs. per cubic foot.

7. The process of claim 1 wherein the fermented feed composition has a dry matter composition ranging from 60 percent to 72 percent.

8. The process of claim 1 wherein the fermented feed composition has a dry matter ranging from 60 percent to 72 percent without requiring any rehydration.

9. The process of claim 1 wherein the high-density hay press comprises an extrusion press.

10. A feed composition for livestock consisting of:
    50 to 72 percent by weight dry alfalfa having an initial moisture content ranging from 8 to 20 percent;
    28 to 50 percent by weight corn silage having an initial moisture content ranging from 50 to 75 percent;
    a density of 25 to 30 pounds per cubic foot;
    a finalized moisture content of less than 35 percent; and
    a dry matter intake ranging from 60 percent to 70 percent.

11. The feed composition of claim 10 wherein the feed composition is baled.

12. The feed composition of claim 10 wherein the bale is wrapped in a silage-grade plastic wrap.

13. The feed composition of claim 10 comprising flattened corn grains.

14. A compressed and baled feed composition for livestock having a dry matter ranging from 60 percent to 70 percent prepared by a process comprising the steps of:
    providing a dry alfalfa having a moisture content ranging from 8 to 20 percent;
    providing a corn silage having an initial moisture content ranging from 50 to 75 percent;
    blending the dry alfalfa with the corn silage to result in a first blend consisting of a weight percent of dry alfalfa ranging from 50 to 72 percent and a weight percent of corn silage ranging from 28 to 50 percent;
    metering the first blend to a high-density hay press;
    pressing the first blend in the high-density hay press into a bale having a density of ranging from 25 to 30 pounds per square foot;
    consolidating the bale;
    sealing the consolidated bale in a silage-grade plastic wrap resulting in a wrapped bale having a weight of approximately 500 kilograms; and
    storing the wrapped bale for a period ranging from 10 to 17 days.

15. The process of claim 14 comprising the further step of sleeving the bale discharged from the high-density hay press.

16. The process of claim 14 wherein the wrapped bale has a moisture content less than thirty-five percent.

17. A method of initiating a fermentation process in a feed composition for livestock comprising the following steps:
    providing a dry alfalfa having a moisture content ranging from 8 to 20 percent;
    providing a corn silage having a moisture content ranging from 50 to 75 percent;
    blending the dry alfalfa with the corn silage to result in a first blend consisting of a weight percent of dry alfalfa ranging from 50 to 72 percent and a weight percent of corn silage ranging from 28 to 50 percent;
    metering the first blend to a high-density hay press;
    pressing the first blend into a bale;
    sealing the bale in a silage-grade plastic wrap resulting in a wrapped bale having a weight of approximately 500 kilograms; and
    storing the wrapped bale for a period ranging from 10 to 17 days to allow completion of the secondary fermentation process.

18. The method of claim 17 wherein the bale has a density ranging from 25 to 35 pounds per square foot.

19. The method of claim 17 comprising the further step of consolidating the baled produced by the high-density press.

20. The process of claim 17 wherein the wrapped bale has a moisture content less than 35 percent.

* * * * *